Aug. 14, 1945. J. J. TOLLMAN 2,382,679
HINGE JOINT FOR ARTIFICIAL LIMBS
Filed Aug. 14, 1944
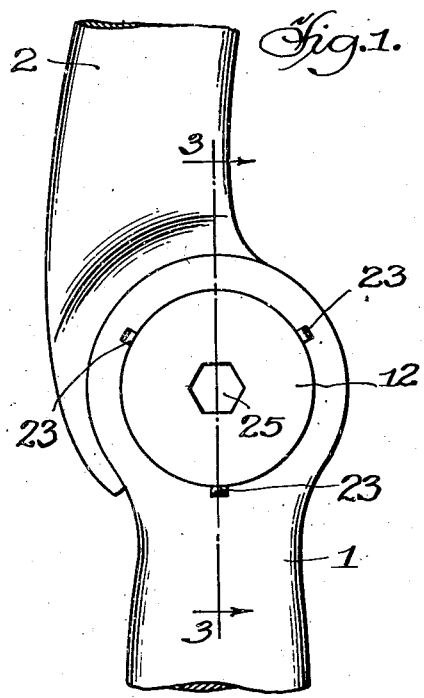
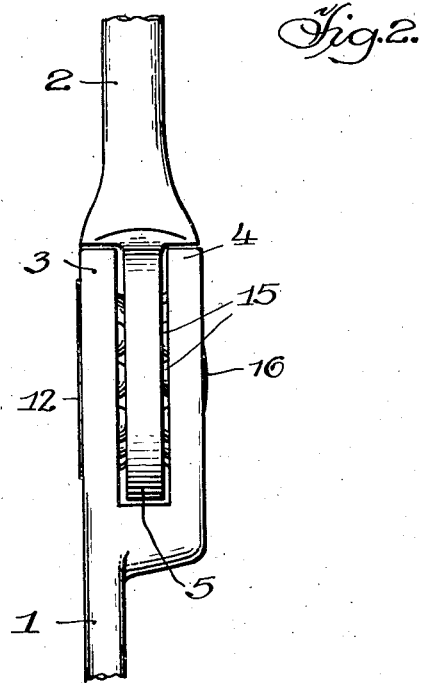
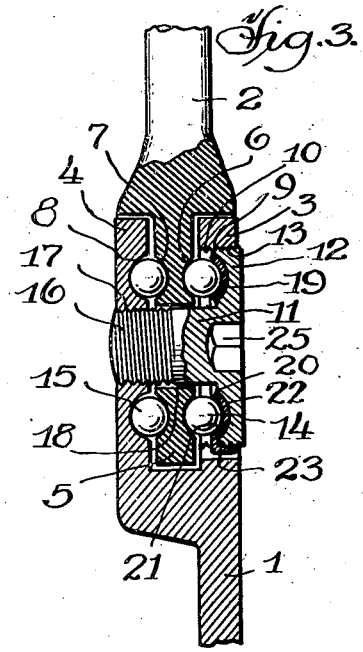
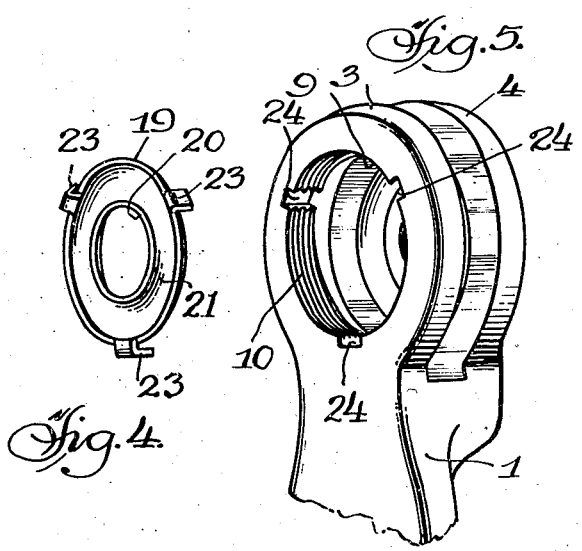
INVENTOR.
Jerry J. Tollman
BY
Parkinson & Lane
Attys.

Patented Aug. 14, 1945

2,382,679

UNITED STATES PATENT OFFICE 2,382,679

HINGE JOINT FOR ARTIFICIAL LIMBS

Jerry J. Tollman, Chicago, Ill.

Application August 14, 1944, Serial No. 549,415

4 Claims. (Cl. 287—100)

My invention relates to an improved hinge joint for artificial limbs, and more particularly to such joint in which is provided a novel lock bearing washer which greatly improves the action, efficiency and durability of the joint.

While I have herein described my invention as applied to knee joints for artificial legs in connection with below-knee amputations, I wish it understood that the same is not limited thereto but may be used in any appropriate structure to which it may be adapted.

In knee joints for artificial limbs in general use prior to my invention, the cone, which has formed therein one of the raceways for the bearing balls, and which constitutes the tightening means for properly adjusting the ball bearings, will in time become loose and cause trouble and annoyance to the wearer of the artificial limb. The proper adjusting of such loose joint is more or less a delicate operation and requires the services of an expert. Many attempts have heretofore been made to prevent loosening of such cone during use of the artificial limb, but such attempts have failed to achieve the success desired.

In the present invention I have successfully overcome the difficulty above referred to, and have at the same time accomplished the further advantage of providing a hardened steel washer having the raceway heretofore formed in the cone, and provided with lugs or projections to seat in corresponding recesses in the threaded opening of one of the two spaced apart shank ears, and so arranged with relation to the cone as to not only prevent the cone from turning loose, but also prevent wear on the cone, prevent the washer from turning, serve as a simple and efficient cone lock, and make possible an easily assembled, efficient and durable joint of the class referred to.

Other objects, advantages and capabilities inherently possessed by my invention, will later more fully appear.

My invention further resides in the combination, construction and arrangement of parts illustrated in the accompanying drawing, and while I have shown therein a preferred embodiment, I wish it understood that the same is susceptible of modification and change without departing from the spirit of my invention.

In the drawing:

Fig. 1 is a side elevation of a hinge joint embodying my invention and showing only a fragmentary portion of each of the two shank members.

Fig. 2 is an edge elevation looking toward the right hand side of Fig. 1.

Fig. 3 is a section taken on the line 3—3 of Fig. 1, looking in the direction of the arrows.

Fig. 4 is a perspective view of the lock bearing washer of my improved joint.

Fig. 5 is a perspective view of the upper portion of the lower shank member.

Referring more in detail to the drawing, my invention comprises a knee joint for providing articulation between the upper and lower shank members 1 and 2, which are attached to the artificial leg proper and the lacer support, respectively. As is known in below-knee amputation artificial legs the leg proper is below the knee joint, the lacer support is above the knee joint, and the hinge joint is in transverse alinement with the knee joint.

As seen in Fig. 3 the lower shank member 1 is formed at its upper end with two parallel upstanding spaced apart ears 3 and 4, and the upper shank member 2 is formed at its lower end with a depending ear 5 slightly less in thickness than the space between ears 3 and 4. Ear 5 is formed in its two side faces with annular raceways 6 and 7. Ear 4 is formed in its inner face with an annular raceway 8 complemental to raceway 7 in ear 5.

Ear 3 is formed with a threaded opening 9, the threads 10 of which extend throughout the thickness of the ear. A cone 11 is provided at one end with an annular flange 12 which around its circumference is formed with threads 13 corresponding in pitch with that of threads 10 and adapted to be snugly screwed thereinto to properly adjust the sets of balls 14 and 15 as later more fully described.

The cone member 11 at its opposite shank end is threaded at 16 to enable it to be screwed into the threaded opening 17 in ear 4 after having been passed through the unthreaded opening 18 in ear 5.

As best seen in Figs. 3 and 4 I have provided a lock bearing washer 19 having in its central portion a hole 20 of a diameter to permit the extended central portion of cone 11 to pass therethrough (see Fig. 3). This washer, surrounding the hole 20, has an annular portion that is concaved on its inner face to form the raceway 21 in which the balls 14 roll when the joint is moved. The rear face of the washer on the side opposite from the raceway 21 is convex to seat into the concave annular groove 22 of the cone member flange 12. The cone member is formed at the central portion of its outer face with a hexagonal hole 25 extending a short distance thereinto to receive a correspondingly shaped end of a wrench to enable the cone to be rotated in the desired direction for tightening or loosening it through rotation of the threads 13 and 16 in the complemental threads in the ears 3 and 4.

It is to be noted in Figs. 3 and 4 that the washer 19 is integrally formed around its outer circumference with spaced lugs or fingers 23. While I have shown and prefer to use three of such lugs or fingers, any greater or less number may be used as desired. These fingers or lugs, when the parts are assembled, are positioned in correspondingly spaced notches or recesses 24, in ear 3, in which they move in depth until the raceway 21 properly contacts balls 14 when the cone is screwed into properly adjusted position. Fingers 23 are somewhat resilient and are bent inwardly a slight amount so that when the cone is screwed into final position they will grip the threads 13 of cone flange 12 sufficiently tightly to prevent the cone from turning loose by any other medium than a wrench inserted in hole 25.

As will be understood in Fig. 3, the set of balls 15 will roll around between the raceways 7 and 8, and the set of balls 14 will roll around between the raceways 6 and 21. The lock bearing washer 19 is of hardened steel and by means of its raceway 21 takes the wear of the balls 14 away from the cone flange and should the washer become broken, worn or damaged in any way it may be easily replaced by a new one at much less cost than would be involved in a new cone. Also the fingers 23 and notches 24 prevent the washer from turning. It is pointed out that the parts are so constructed that pressure upon the washer by the cone causes a tendency to slightly flex the washer and further press the fingers against the threads of the cone flange and further prevent inadvertent loosening of the cone.

Having thus described my invention, I claim:

1. In a hinge joint, a pair of shank members, one of which has a pair of spaced apart apertured ears and the other of which has a single apertured ear formed with a bearing ball raceway in one of its faces, a cone member having threaded engagement with the aperture in one of the spaced apart ears, an annular groove in the cone member, and a hardened steel removable and replaceable washer in the groove of the cone member, said washer having an annular groove forming a raceway complemental to the first mentioned raceway, upstanding fingers on the washer, the last mentioned one of the spaced apart ears having recesses receiving said fingers to prevent rotational movement of the washer with relation to its ears, said fingers having gripping engagement with the threads of the cone member when the bearing balls and raceways are properly adjusted, to prevent loosening of the cone.

2. In a hinge joint provided with a pair of oppositely rotatable members, complemental raceways in said members, balls in said raceways, one of said raceways comprising a removable and replaceable washer, said washer having upstanding fingers projecting rearwardly away from the washer raceway, a cone member having threaded engagement with one of the rotatable members, said fingers being resilient and adapted to grip the cone member when the parts are properly adjusted to prevent looseness of the cone member.

3. In a hinge joint for artificial limbs and the like, a shank member having a pair of parallel spaced apart apertured ears, a second shank member having an apertured ear adapted to be rotatably positioned between the spaced apart ears with the apertures of the ears concentric, the apertures in the spaced apart ears being threaded, and one thereof being of greater diameter than the other, a cone member having a flange and a shank both threaded to engage the threads in the apertures of the spaced apart ears, the one of the spaced apart ears which is threadably engaged by said flange having notches around its aperture edge, a metal washer in the inner face of said flange, said washer having in its inner face a raceway, a complemental raceway in the adjacent face of the ear of the second shank member, a raceway in the opposite face of the last mentioned ear and a complemental raceway on the inner face of the other one of said spaced apart ears, balls in said raceways, and rearwardly extending fingers on the washer extending into said notches, said fingers having some resilience and gripping the threads of the flange when the cone member is properly adjusted, to prevent the cone member from becoming loose in the spaced apart ears.

4. In a hinge joint for artificial limbs and the like, a first shank member having an apertured ear, a second shank member having an apertured ear, a raceway in the ear of the second shank member, a cone member having threaded engagement in the aperture of the ear of the first shank member, a washer removably seated against the cone member and having a raceway complemental to the first mentioned raceway, rearwardly extending fingers on the washer, said ear of the first shank member having recesses around the margin of its aperture, said fingers extending into said recesses and having gripping engagement with the cone member.

JERRY J. TOLLMAN.